(12) United States Patent
Wei et al.

(10) Patent No.: US 10,114,192 B2
(45) Date of Patent: Oct. 30, 2018

(54) LENS MODULE

(71) Applicants: Chuandong Wei, Shenzhen (CN); Jie Ma, Shenzhen (CN); Junjie Yan, Shenzhen (CN); Yuchan Gao, Shenzhen (CN)

(72) Inventors: Chuandong Wei, Shenzhen (CN); Jie Ma, Shenzhen (CN); Junjie Yan, Shenzhen (CN); Yuchan Gao, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 0 days.

(21) Appl. No.: 15/082,836

(22) Filed: Mar. 28, 2016

(65) Prior Publication Data

US 2017/0139174 A1 May 18, 2017

(30) Foreign Application Priority Data

Nov. 17, 2015 (CN) ..................... 2015 2 0914264 U

(51) Int. Cl.
| | |
|---|---|
| *G02B 7/02* | (2006.01) |
| *G02B 13/00* | (2006.01) |
| *G02B 9/04* | (2006.01) |
| *G02B 7/00* | (2006.01) |

(52) U.S. Cl.
CPC ............. *G02B 7/026* (2013.01); *G02B 7/003* (2013.01); *G02B 7/021* (2013.01); *G02B 9/04* (2013.01); *G02B 13/001* (2013.01); *G02B 13/003* (2013.01)

(58) Field of Classification Search
CPC .......... G02B 7/02; G02B 7/021; G02B 7/022; G02B 7/025; G02B 7/026; G02B 9/04; G02B 13/001; G02B 13/003; G02B 13/18; G03B 17/00; H04N 5/2252; H04N 5/2254; H04N 5/74
USPC ....... 359/740, 793, 811, 819, 823, 824, 830, 359/826; 348/25, 31, 360, 362, 373, 374; 396/89, 91, 98
See application file for complete search history.

(56) References Cited

U.S. PATENT DOCUMENTS

| | | | | |
|---|---|---|---|---|
| 7,230,777 B2 * | 6/2007 | Ye | ........................... | G02B 7/021 359/701 |
| 7,609,322 B2 * | 10/2009 | Takada | .................... | G02B 7/026 348/360 |
| 7,715,126 B2 * | 5/2010 | Apel | ....................... | G02B 7/026 359/819 |
| 7,944,633 B2 * | 5/2011 | Shyu | ........................ | B29C 43/18 359/811 |
| 8,675,127 B2 * | 3/2014 | Nakajima | ............. | H04N 5/2253 348/359 |
| 9,223,115 B2 * | 12/2015 | Fujii | ..................... | G02B 13/001 |
| 9,746,634 B2 * | 8/2017 | Wei | ........................ | H04N 5/2254 |

\* cited by examiner

*Primary Examiner* — Loha Ben
(74) *Attorney, Agent, or Firm* — Na Xu; IPro, PLLC

(57) ABSTRACT

The present disclosure discloses a lens module. The lens module includes a lens barrel and a lens group. The lens group is installed inside the lens barrel. The lens barrel includes a first barrel wall extended horizontally and a second barrel wall bended and extended from the first barrel wall. The lens module includes also a stop installed inside the lens barrel. The stop is installed inside the lens barrel and clamped between the first barrel wall and the lens group. The stop and the lens group are lined up in turn from object side to image side.

4 Claims, 1 Drawing Sheet

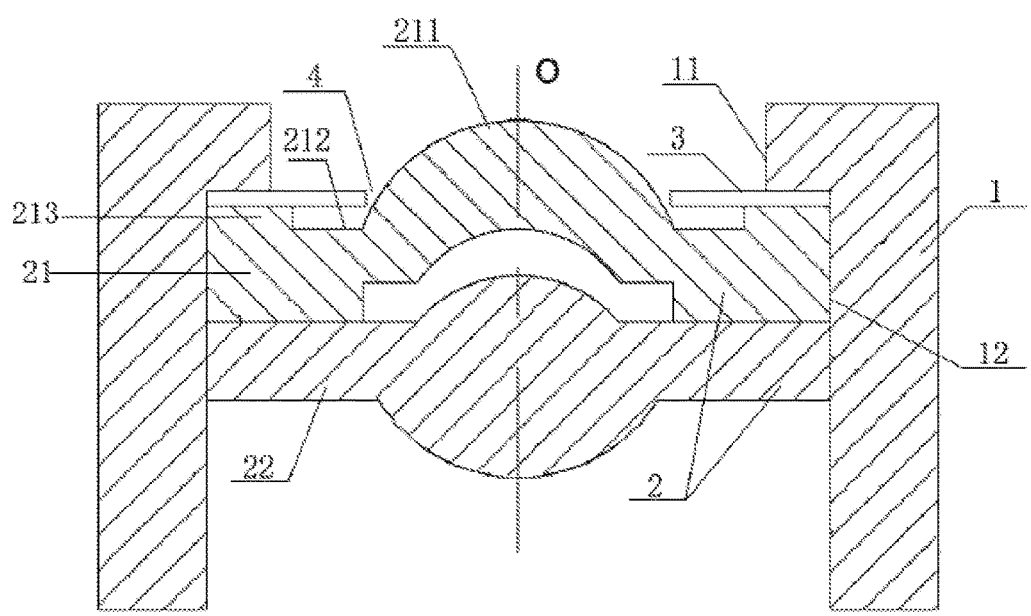

LENS MODULE

FIELD OF THE DISCLOSURE

The present disclosure generally relates to the technical field of optical imaging, more particular to a lens module used in camera, video camera, mobile phone, tablet, notebook PC and other electronic devices.

BACKGROUND

As the photographic technology and the electronic products with photographic function are developed in recent years, optical camera lens module is used widely in all kinds of products. In order to follow the current trend that the size of electronic products becomes smaller and smaller, the lens module shall also be miniaturized.

In the existing technology, the lens module comprises a lens barrel having an optical axis, lenses located in the lens barrel, and a stop clamped between lenses. The lens barrel comprises a first barrel wall extended horizontally (direction perpendicular to the direction of the optical axis of the lens barrel) and a second barrel wall extended from the first barrel wall along the optical axis direction. A light hole is created on the first barrel wall for the lens. However, the light hole on the first barrel wall requires the barrel wall with a certain thickness; therefore, the wall thickness of the barrel wall is increased. The height and weight of entire lens module is increased. It will be more difficult to produce lens barrel.

For this reason, it is necessary to provide a novel lens module to overcome the shortcomings above.

BRIEF DESCRIPTION OF THE DRAWINGS

Many aspects of the embodiment can be better understood with reference to the following drawing. The components in the drawing are not necessarily drawn to scale, the emphasis instead being placed upon clearly illustrating the principles of the present disclosure.

FIG. 1 is a schematic diagram of a lens module in one embodiment of the present disclosure.

DETAILED DESCRIPTION

The present disclosure will be described in detail below with reference to the attached drawings and an exemplary embodiment thereof.

FIG. 1 shows a lens module in one embodiment of the utility model. The lens module comprises a lens barrel 1 and a lens group 2. The lens group 2 is installed inside the lens barrel 1. The lens barrel 1 comprises a first barrel wall 11 extended horizontally (direction perpendicular to the direction of the optical axis of the lens barrel.) and a second barrel wall 12 extended from the first barrel wall 11 along the optical axis direction. The lens module comprises a stop 3 installed inside the lens barrel 1 and clamped between the first barrel wall 11 and the lens group 2. The stop 3 and the lens group 2 are lined up in turn from object side to image side. The stop 3 creates a light hole 4.

The lens group 2 shown in FIG. 1 includes a first lens 21 and a second lens 22. The quantity of the lenses in actual lens group can be changed greatly according to different types and different focal lengths of lens barrels.

An object side refers to the side of the lens barrel closer to the object. An image side refers to the opposite side of the object side. It can be seen in FIG. 1 that the first barrel wall 11 is closer to object side, and the overall radial extension of the first barrel wall 11 is greater than the thickness of th second barrel wall 12.

In the lens module in the embodiment, the lens group 2 is provided with the first lens 21. The first lens 21 includes a first optical part 211 and a first bearing part 212 surrounding the first optical part 211. A normal projection of the first optical part 211 along the optical axis O is located at least partially on the stop 3.

In the lens module, the first lens 21 is provided with a lug 213 extended from the first bearing part 212 to the first barrel wall 11. The stop 3 is located partially on the lug 213.

In the embodiment, the axis of the lens group 2 and the axis of the light hole 4 are aligned with each other and with the optical axis of the lens barrel.

The stop 3 is a hollow ring. In this embodiment, the thickness of the stop 3 is 1 mm-5 mm. The main purpose of the stop is to improve the image quality of the lens by reducing the reflective light on the inner wall of the light hole, so that the thickness of the stop cannot exceed the width of the lug molded with the lens barrel along an axial direction of the lens.

The beneficial effects of the lens module of the present disclosure are as follows:

1. The stop is clamped between the first barrel wall and the lens group. The lens group installed inside the lens barrel presses down the stop on the lug. The stop creates a block structure for installing the lens group and replacing the convex part molded on existing lens barrel. As the thickness of the stop is much smaller than the width of the lug along the axial direction of the lens barrel, the length of the lens barrel is reduced greatly.

2. As the thickness of the stop is much smaller than the width of the convex part along the axial direction of the lens barrel, the reflection of the light on the inner surface of the stop is reduced significantly when the light passes through the light hole in the lens group. The glare of imaging is reduced greatly and the image quality of the lens is improved.

3. When the lens barrel top has a certain thickness, as the length of the lens barrel is reduced due to the stop, the production difficulty of the lens barrel is reduced and the yield of qualified lens barrel is increased.

It is to be understood, however, that even though numerous characteristics and advantages of the present embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A lens module comprising:
   a lens barrel having an optical axis and comprising a first barrel wall extended horizontally, i.e., in a direction perpendicular to the direction of the optical axis of the lens barrel, and a second barrel wall extended from the first barrel wall along the optical axis direction;
   a lens group installed inside the lens barrel, and comprising a stop installed inside the lens barrel; wherein:
   the stop is installed inside the lens barrel and clamped between the first barrel wall and the lens group; the stop and the lens group are lined up in turn from an object side to an image side along the optical axis;
   the lens group is provided with a first lens and a second lens, the first lens including a first optical part, a first bearing part surrounding the first optical part and a lug;
the stop is clamped between the first barrel wall and the lug;
the lug is extended from the first bearing part to the first barrel wall; and wherein the stop is located partially on the lug.

2. The lens module according to claim 1, wherein the stop is a hollow ring.

3. The lens module according to claim 2, wherein a normal projection of the first optical part along the optical axis of the lens barrel is located at least partially above the stop.

4. The lens module according to claim 1, wherein the stop forms a light hole, and an axis of the lens group and an axis of the light hole are aligned with each other and with the optical axis of the lens barrel.

* * * * *